United States Patent [19]

Cavezzan et al.

[11] Patent Number: 4,518,758
[45] Date of Patent: May 21, 1985

[54] ORGANOPOLYSILOXANE/POLYURETHANE ELASTOMERIC BLOCK COPOLYMERS

[75] Inventors: Jacques Cavezzan, Villeurbanne; Christian Prud'Homme, Lyons, both of France

[73] Assignee: Rhone-Poulenc Specialites Chimiques, Courbevoie, France

[21] Appl. No.: 423,259

[22] Filed: Sep. 24, 1982

[30] Foreign Application Priority Data

Sep. 30, 1981 [FR] France ............... 81 18573

[51] Int. Cl.³ .................. C08G 18/61; C08G 77/26; C08G 77/42
[52] U.S. Cl. .................. 528/12; 525/474; 528/28; 528/29; 528/31; 528/33
[58] Field of Search ............ 525/474; 528/28, 12

[56] References Cited

U.S. PATENT DOCUMENTS

3,562,352  2/1971  Nyilas ................... 525/440
4,098,742  7/1978  Mueller ................. 525/474

FOREIGN PATENT DOCUMENTS

933683  8/1963  United Kingdom ........ 525/474

OTHER PUBLICATIONS

Chemical Abstracts, 86, 122592, (1977).

*Primary Examiner*—Wilbert J. Briggs, Sr.
*Attorney, Agent, or Firm*—Burns, Doane, Swecker & Mathis

[57] ABSTRACT

Novel organopolysiloxane/polyurethane block copolymers which are thermoplastic elastomers and which possess good thermomechanical properties, are comprised of the following recurring units (A) and (B):

$$+C-NH-(G_2-NH-C-O)_{\overline{a}}-Z-(O-C-NH-G_2)_{\overline{a}}-NH-C+ \quad (A)$$
$$\quad \|\quad\quad\quad\quad\quad\| \quad\quad\quad\quad \| \quad\quad\quad\quad\quad \|$$
$$\quad O \quad\quad\quad\quad\quad O \quad\quad\quad\quad O \quad\quad\quad\quad\quad O$$

$$+O-(G_1-O-C-NH-G_2-NH-C-O)_m-G_1-O+ \quad (B)$$
$$\quad\quad\quad\quad\quad \| \quad\quad\quad\quad\quad\quad \|$$
$$\quad\quad\quad\quad\quad O \quad\quad\quad\quad\quad\quad O$$

wherein Z is a divalent radical which comprises a polysiloxane block and has the formula:

$$-Y-Si\begin{pmatrix}R\\|\\R\end{pmatrix}\left[O-Si\begin{pmatrix}R\\|\\R\end{pmatrix}\right]_n Y'-,$$

in which Y and Y' are each a divalent radical having one of the formulae:

$$-T-CH-\underset{\underset{R_2}{|}}{\overset{\overset{R_3}{|}}{C}}-$$
$$\quad\quad\quad |$$
$$\quad\quad R_1$$

$$-T'\underset{C}{\overset{C-}{\diagup}}\!\!\!\diagdown_{R_1}^{H}$$

wherein T and T' comprise the divalent or trivalent residue having from 1 to 20 carbon atoms of an unsaturated isocyanate or alcohol having one of the formulae:

$$OCN-T-CR_1=CR_2R_3$$

$$HO-T-CR_1=CR_2R_3$$

$$HO-T'\overset{C-R_2}{\underset{C-R_1}{\diagup\!\!\!\|\!\!\!\diagdown}}$$

$$OCN-T'\overset{C-R_2}{\underset{C-R_1}{\diagup\!\!\!\|\!\!\!\diagdown}}$$

or an oxygen, sulfur, silicon, nitrogen, ester or amide interrupted such T or T' residue, and further wherein $R_1$, $R_2$ and $R_3$ are each hydrogen, alkyl or aryl, with the proviso that two of the radicals $R_1$ and $R_2$ may together form a single alkylene radical; each R is an alkyl or halogenoalkyl radical having from 1 to 5 carbon atoms and containing from 1 to 7 chlorine and/or fluorine substituents, cycloalkyl or halogenocycloalkyl radical having from 3 to 8 carbon atoms and containing from 1 to 4 chlorine and/or fluorine substituents, aryl, alkylaryl or halogenoaryl radical having from 6 to 8 carbon atoms and containing from 1 to 4 chlorine and/or fluorine substituents, or a cyanoalkyl radical having from 3 to 4 carbon atoms; n is a number of at least 10; $G_1$ and $G_2$ are each divalent hydrocarbon radicals having from 2 to 20 carbon atoms, or two such hydrocarbon radicals joined together by a direct valence bond or through an oxygen atom or alkylene or alkylidene bridge having from 1 to 4 carbon atoms; m is a number ranging from 1 to 20; and a is a number which is either zero or 1.

11 Claims, No Drawings

ORGANOPOLYSILOXANE/POLYURETHANE ELASTOMERIC BLOCK COPOLYMERS

BACKGROUND OF THE INVENTION

1. Field of the Invention

The present invention relates to novel thermoplastic elastomers based upon silicones, and, more especially, to elastomers which are block copolymers comprising polysiloxane and urethane segments. The invention also relates to the preparation of such elastomeric copolymers.

2. Description of the Prior Art

Thermoplastic silicone elastomers are well known to this art, for example, those described in French Pat. Nos. 2,300,778, 2,362,183 and 2,414,519 and French Application No. 78/26,245, assigned to the assignee hereof. These elastomers are prepared by a hydrosilylation reaction between a difunctional $\alpha,\omega$-bis-vinylsilyl compound and an $\alpha,\omega$-dihydrogenopolysiloxane. To produce the elastomers, it is therefore necessary to prepare the difunctional $\alpha,\omega$-bis-vinylsilyl compound as an intermediate, the latter being itself prepared from an unsaturated silane and a coupling agent. It is for this reason that the preparation of these thermoplastic organosilicon copolymers can prove relatively expensive, which constitutes a formidable obstacle to the economic development of said elastomers.

Furthermore, numerous block copolymers containing polysiloxane blocks are also known and which contain various other segments, such as polyester, polyether and polyurethane, and the like. Polysiloxane/polyurethane copolymers are thus known, such as those described in French Pat. Nos. 1,370,886 and 1,371,405 and in Russian Pat. No. 262,385. These copolymers provide solid substances having very little or no elastomeric character.

The block copolymers of the prior art are prepared either by reacting an organic polyisocyanate with "macrodiols" comprising polysiloxane segments [French Pat. No. 1,370,886, Russian Pat. No. 262,385, the article in *Vysokomol Soedin*, series B, 14, 9, pages 682–684 (1972), and the like], or by the condensation of a "short" organic diol with an $\alpha,\omega$-bis-(isocyanatoalkyl)-polysiloxane (French Pat. No. 1,371,405, and the like).

It has now been determined that the various processes of the prior art do not enable the preparation of copolymers comprising polysiloxane and polyurethane functions which possess good elastomeric properties. This finding would appear to be the consequence of the incompatibility observed between the long polysiloxane segments and the urethane segments. In other words, the lengthening of the polysiloxane block required in order to obtain good elastomers resulted in the appearance of heterogeneity in the medium when reacting a macrodiol (or a macrodiisocyanate) containing a long polysiloxane chain and a short polyisocyanate (or short polyol).

SUMMARY OF THE INVENTION

Accordingly, a major object of the present invention is the provision of a novel class of polysiloxane/polyurethane block copolymers having excellent elastomeric properties, the elastomeric nature of which being markedly dependent upon the chemical constitution of the block segments comprising the copolymers and the reaction medium itself, all in contradistinction to the state of this art.

Briefly, the subject novel organopolysiloxane/polyurethane block copolymers comprise the recurring units A and B respectively having the structural formula:

Units A [formula (A)]:

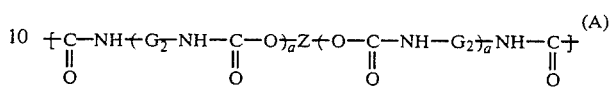

Units B [formula (B)]:

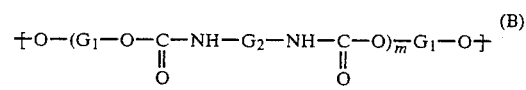

in which:

(i) Z represents a divalent radical comprising a polysiloxane block and having the formula:

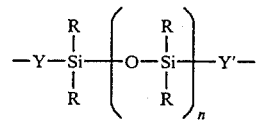

the various symbols Y, Y', R and n respectively representing:

(ii) Y: an inert divalent radical of hydrocarbon type, selected from among the following groups:

$$-T-CH-C- \atop \phantom{-T-}R_1\phantom{-}R_2$$
with $R_3$ on the C,

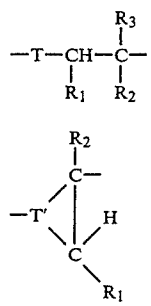

with T and T' respectively representing inert divalent and trivalent radicals defining a moiety of the molecular structure of an unsaturated isocyanate or of an unsaturated alcohol of the formula:

$$OCN-T-CR_1=CR_2R_3; \quad HO-T-CR_1=CR_2R_3$$

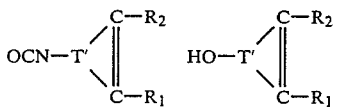

such radicals T and T' being of hydrocarbon type, containing from 1 to 20 carbon atoms and containing, if appropriate, one or more hetero-atoms or groups selected from among oxygen, sulfur, silicon and nitrogen atoms and ester or amide groups, the symbols $R_1$, $R_2$ and $R_3$ representing a hydrogen atom or an alkyl or aryl group, and it being possible for the two radicals $R_1$ and $R_2$ to together form an alkylene radical;

(iii) Y′: a group having the same definition as Y;
(iv) R: the same or different radicals selected from among:
  (a) alkyl or halogenoalkyl radicals having from 1 to 5 carbon atoms and containing from 1 to 7 chlorine and/or fluorine atoms;
  (b) cycloalkyl or halogenocycloalkyl radicals having from 3 to 8 carbon atoms and containing from 1 to 4 chlorine and/or fluorine atoms;
  (c) aryl, alkylaryl and halogenoaryl radicals having from 6 to 8 carbon atoms and containing from 1 to 4 chlorine and/or fluorine atoms; and
  (d) cyanoalkyl radicals having from 3 to 4 carbon atoms;
(v) n: a number equal to or greater than 10;
(vi) $G_1$, $G_2$: divalent radicals of hydrocarbon type, corresponding respectively to the diol $G_1(OH)_2$ and the diisocyanate $(G_2(NCO)_2$, $G_1$ and $G_2$ having from 2 to 20 carbon atoms;
(vii) m: a number between 1 and 20; and
(viii) a: a number equal to zero or 1.

DETAILED DESCRIPTION OF THE INVENTION

More particularly according to this invention, the novel block copolymers provided hereby preferably comprise copolymeric chains of the recurring units A and B in which the various symbols have the following meanings:
(i) T represents one of the following groups:
  (a) a purely hydrocarbon alkylene, cycloalkylene, arylene, alkylarylene or arylalkylene group; or
  (b) a chain of two groups selected from among alkylene, cycloalkylene and arylene groups and joined to one another by a direct valence bond, an oxygen atom, a sulfur atom, an ester or amide group, a nitrogen group

with $R_4$ representing a hydrogen atom or an alkyl group, or a diorganosilyl group of the formula:

with R′ representing a methyl, vinyl or phenyl radical, these various radicals being optionally halogenated;
(ii) T′: an alkanetriyl, cycloalkanetriyl or alkylcycloalkanetriyl group;
(iii) $R_1$, $R_2$, $R_3$: a hydrogen atom, an alkyl radical having from 1 to 4 carbon atoms, or a phenyl or tolyl radical, it being possible for $R_1$ and $R_2$ to together form a linear or branched chain, divalent alkylene radical having from 2 to 6 carbon atoms;
(iv) $G_1$: alkylene radicals having from 2 to 12 carbon atoms, cyclohexylene or cyclopentylene radicals, or a combination of 2 groups selected from among alkylene groups having from 2 to 12 carbon atoms, and cyclohexylene or cyclopentylene radicals, joined to one another by a direct valence bond, an oxygen atom or an alkylene or alkylidene group having from 1 to 4 carbon atoms;
(v) $G_2$: alkylene radicals having from 2 to 12 carbon atoms, cyclohexylene or cyclopentylene radicals, phenylene, methylphenylene or dimethylphenylene radicals, or alternatively a combination of two groups selected from among alkylene groups having 2 to 12 carbon atoms, and cyclohexylene, cyclopentylene, phenylene, methylphenylene or dimethylphenylene radicals, joined to one another by a direct valence bond, an oxygen atom or an alkylene or alkylidene group having from 1 to 4 carbon atoms;
(vi) n: a number between 10 and 80;
(vii) m: between 4 and 10; and
(viii) a and R: as above defined.

Among the block copolymers comprised of the recurring units (A) and (B) according to this invention, also preferred are those in which the several variables are defined as follows:
(i) T: represents one of the following groups:
  (a) an alkylene group having at most 12 carbon atoms, a cyclopentylene or cyclohexylene group or a phenylene, methylphenylene or dimethylphenylene group; or
  (b) a combination of two groups selected from among alkylene groups having from 2 to 12 carbon atoms, and cyclohexylene, cyclopentylene, phenylene, methylphenylene and dimethylphenylene groups, the two groups making up the combination being joined together by a direct valence bond, or by one of the following hetero-atoms or groups:

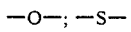

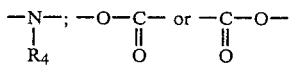

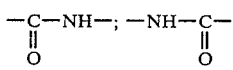

with $R_4$ representing a hydrogen atom or an alkyl group having from 1 to 4 carbon atoms, and R′ representing a methyl, vinyl or phenyl group;
(ii) T′: the group

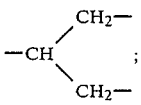

(iii) $R_1$, $R_2$, $R_3$: a hydrogen atom or a methyl, ethyl or phenyl group, it being possible for the two radicals $R_1$ and $R_2$ to together form a trimethylene or tetramethylene group;
(iv) R: a methyl, vinyl or phenyl radical, it being intended for these radicals to be optionally substituted by 1 to 4 chlorine and/or fluorine atoms;
(v) $G_1$: alkylene radicals having from 2 to 6 carbon atoms, cyclopentylene or cyclohexylene radicals, or alternatively a combination of two groups selected from among alkylene groups having from 2 to 6 carbon atoms, and cyclohexylene or cyclopentylene radicals, joined to one another by a direct valence bond, an oxygen atom or a methylene group;

(vi) G₂: alkylene radicals having from 2 to 6 carbon atoms, cyclopentylene, cyclohexylene, phenylene or methylphenylene radicals, or alternatively a combination of two groups selected from among alkylene groups having from 2 to 6 carbon atoms, and cyclohexylene, cyclopentylene, phenylene and methylphenylene radicals, joined to one another by a direct valence bond, an oxygen atom or a methylene group; and (vii) the other symbols n, a and m being as immediately above-defined, under [vi], [vii] and [viii].

Finally, in another preferred embodiment according to the present invention, in the novel copolymers comprised of the recurring units (A) and (B), the several variables are defined as follows:

(i) Y: represents the following divalent group:

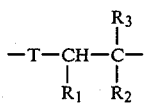

with T representing either an alkylene group having at most 12 carbon atoms, or a cyclopentylene, cyclohexylene, phenylene or methylphenylene group, or a combination of two groups selected from among alkylene groups having from 2 to 12 carbon atoms, and cyclohexylene and cyclopentylene groups, the two groups being joined together by a direct valence bond, or by one of the following hetero-atoms or groups:

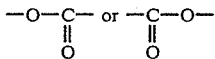

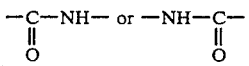

with R' representing a methyl group, and R₁, R₂ and R₃ representing a hydrogen atom or a methyl, ethyl or phenyl group, it being possible for the two radicals R₁ and R₂ to together form a trimethylene or tetramethylene group;

(ii) R: a methyl radical;

(iii) G₁: a linear alkylene radical having from 4 to 6 carbon atoms;

(iv) G₂: alkylene radicals having from 2 to 6 carbon atoms, cyclopentylene, cyclohexylene or phenylene radicals, or a combination of 2 groups selected from among alkylene groups having from 2 to 6 carbon atoms, and cyclohexylene and cyclopentylene groups; and (v) the other symbols n, a and m being as above-defined, under [vi], [vii] and [viii].

By way of illustration, among the block copolymers comprised of the recurring units (A) and (B) according to the invention, exemplary are those in which the various symbols have the following precise meanings:

Group:

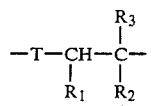

—CH₂—CH₂—CH₂—

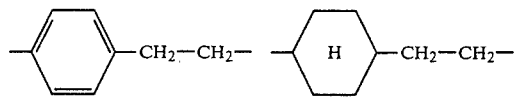

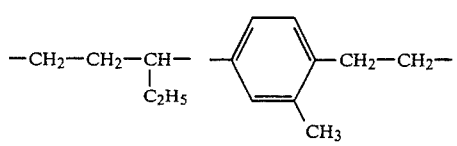

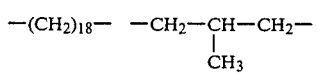

—(CH₂)₆—O—(CH₂)₃—

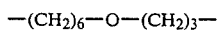

—(CH₂)₁₁—   —(CH₂)₂—O—(CH₂)₃—

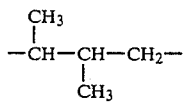

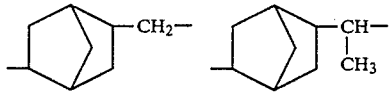

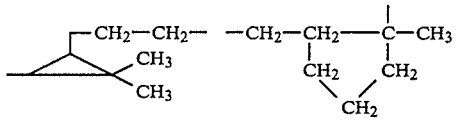

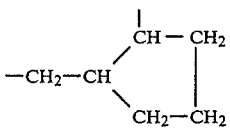

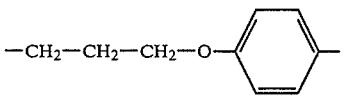

with n equal to 1, 2 or 3

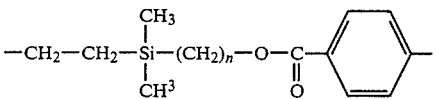

with n equal to 1, 2 or 3

-continued

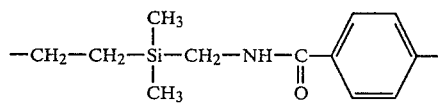

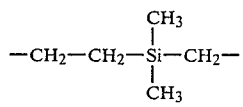

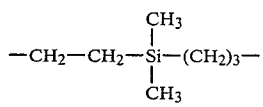

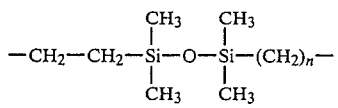

with n equal to 1, 2 or 3

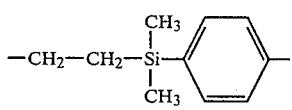

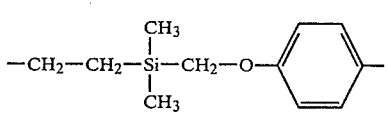

Symbol Y:

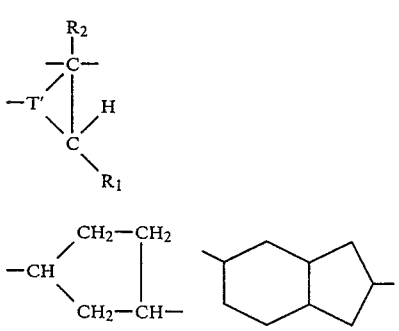

Symbol R:

Methyl, ethyl, propyl, isopropyl, butyl, isobutyl, α-pentyl, t-butyl, chloromethyl, dichloromethyl, α-chloroethyl, α,β-dichloroethyl, fluoromethyl, difluoromethyl, α,β-difluoroethyl, 3,3,3-trifluoropropyl, trifluorocyclopropyl, 4,4,4-trifluorobutyl, 3,3,3,4,4,5,5-heptafluoropentyl, β-cyanoethyl, γ-cyanopropyl, phenyl, p-chlorophenyl, m-chlorophenyl, 3,5-dichlorophenyl, trichlorophenyl, tetrachlorophenyl, o-, p- or m-tolyl and α,α,α-trifluorotolyl groups, and xylyl groups such as 2,3-dimethylphenyl and 3,4-dimethylphenyl.

Preferably, the organic radicals bonded to the silicon atoms are methyl, phenyl or vinyl radicals, it being possible for these radicals to be optionally halogenated, or alternatively cyanoalkyl radicals.

Symbol G$_1$:

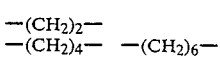

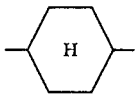

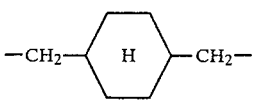

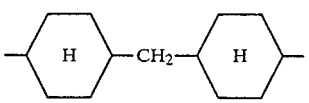

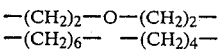

Symbol G$_2$:

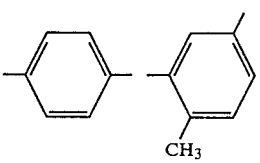

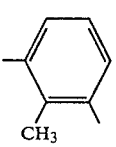

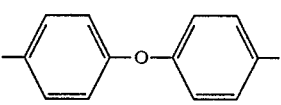

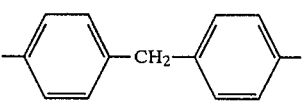

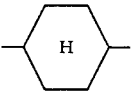

Among the specific illustrations of the various symbols, especially preferred are the copolymers in which the symbols G$_1$ and G$_2$ represent a hexamethylene group.

Finally, it will be appreciated that the numbers n amd m are not necessarily integers, since the units A and B correspond in general to an average formula of said units.

Another object of the present invention is the provision of a process for the preparation of the subject polysiloxane/polyurethane block copolymers comprising recurring units of the formulae (A) and (B); this process is characterized in that a difunctional compound of the formula (I): X—Z—X' is reacted, in a solvent medium consisting of a halogenated hydrocarbon, with at least one diol of the formula (II): HO—G$_1$—OH and with at least one diisocyanate of the formula (III): OCN—G$_2$—NCO, the symbols X and X', which are identical, representing a hydroxyl group or an isocyanate group and the various symbols Z, $G_1$ and $G_2$ being as above-defined, the compounds of the formulae (I), (II) and (III) being introduced in amounts such that the ratio of all of the NCO groups to all of the OH groups ranges from 0.9 to 1.1, and in that the molar ratio:

$$r = \frac{\text{compound } X - Z - X' \text{ (I)}}{\text{antagonistic compound (II) or (III)}}$$

ranges from 0.045 to 0.5, the "antagonistic" compound being such that it reacts with the compound (I) to form the two linking urethane groups.

Thus, if the compound X—Z—X' is a macrodiisocyanate comprising the polysiloxane block, it is the diol (II) which is the antagonistic compound, and it is readily apparent to one skilled in this art that, with the overall ratio total number of NCO/total number of OH being fixed, it is the knowledge of the molar ratios of the reactants, for example, the molar ratio macrodiisocyanate/short diol, which will make it possible to determine the value of m and hence the length of the rigid segment.

The molar distribution of the various species, namely, the difunctional compound (I), the diol HO—$G_1$—OH and the diisocyanate OCN—$G_2$—NCO, will therefore determine the number-average molecular weight, the distribution between the flexible (polysiloxane) segments and the rigid (urethane) segments and the length of the rigid segment. It is this distribution which enables obtainment of thermoplastic elastomers of good quality.

The difunctional compound of the formula (I), which can be the diisocyanate $(I)_a$

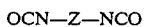

OCN—Z—NCO                    $(I)_a$ comprising the polysiloxane block, or which can be the diol $(I)_b$

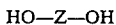

HO—Z—OH                      $(I)_b$ comprising the polysiloxane block, is itself obtained by hydrosilylation of an α,ω-dihydrogenopolysiloxane of the formula (IV)

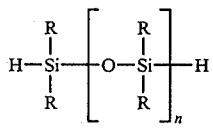

(IV)

with an olefinic compound comprising an isocyanate or hydroxyl group. The process for the preparation of these difunctional compounds $(I)_a$ and $(I)_b$ will now be defined below.

Preferably, and this circumscribes another object of the present invention, the polysiloxane/polyurethane elastomers are prepared in accordance with a process as defined above which is characterized in that the ratio of all of the NCO groups to all of the OH groups ranges from 0.95 to 1.05, and in that the molar ratio r ranges from 0.08 to 0.170.

It will also be appreciated that the processes for the preparation of the polysiloxane/polyurethane elastomers which correspond to one of the preferred embodiments of copolymers as defined above also circumscribe another object of the present invention. Advantageously, a diisocyanate comprising the polysiloxane block is used as the difunctional compound I.

As already above-mentioned, the polycondensation reaction of the difunctional compound (I) comprising the polysiloxane block with the diol (II) and the diisocyanate (III) must be carried out in a medium which ensures compatibility between the polysiloxane segments and the urethane segments.

This compatibility is essentially obtained by the judicious selection of definite solvents enabling obtainment of a homogeneous or substantially homogeneous medium during the polycondensation reaction. However, the existence of a totally homogeneous medium throughout the polycondensation reaction is not obligatory. Certain media which become turbid during the polycondensation reaction nevertheless provide block copolymers having good elastomeric properties.

The compatibility of the reaction medium is essentially provided by the judicious selection of definite solvents, as noted above, but it must also be understood that the choice of the nature of the various rigid and flexible blocks also contributes to providing this compatibility.

The solvents essentially providing this compatibility are aliphatic or aromatic halogenated hydrocarbons. Among these, particularly advantageously employed are o-dichlorobenzene, tetrachloroethane, and the like.

The amount of solvent used can vary over wide limits and usually ranges from 50% to 95%, and preferably ranges from 70% to 80%, relative to the total mass of the reactants.

The polycondensation reaction can be carried out either in the absence or presence of a catalyst. Any conventional catalyst which is well known in the chemistry of reactions between an isocyanate group and a hydroxyl group is suitable; among these, representative are heavy metal derivatives, such as dibutyl-tin dilaurate, and the like.

The polycondensation reaction adopted to provide the subject block copolymer is carried out simply by heating the reactants to a temperaure which typically ranges from 110° to 180° and preferably ranges from 120° to 160°. If appropriate, the various reactants can be introduced in separate portions. When the reaction is complete, the copolymer is separated from the reaction medium by any known means, for example, by precipitation following the addition of a non-solvent, such as an alcohol (methanol, ethanol, butanol, or the like), a ketone, or the like. It is also possible to obtain the block copolymer simply by removing the solvent, for example, by evaporation.

If a diol comprising the polysiloxane block is introduced as the difunctional compound (I), the reaction is advantageously carried out in two stages. During the first step, a portion or the total amount of the diisocyanate (III) is added to the reaction medium consisting of the compound (I) and the solvent, such as to form a "macrodiisocyanate" comprising the polysiloxane block. In a second step, the remainder of the reactants are introduced.

If it is desired to employ a diisocyanate comprising the polysiloxane block, the latter is prepared, for example, by reacting an α,ω-dihydrogenopolysiloxane with a monoisocyanate containing one site of ethylenic unsaturation and having one of the following formulae:

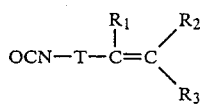

or

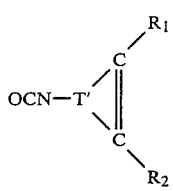

The unsaturated isocyanate can therefore have an alicyclic, cyclic or bicyclic aliphatic structure. It is easy to determine the precise nature of the various isocyanates T, T', $R_1$, $R_2$ and $R_3$ have already been defined above.

Among the unsaturated isocyanates, the compounds having the following formulae are representative:

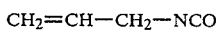

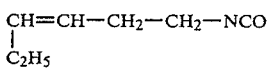

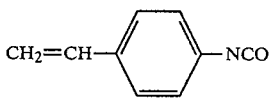

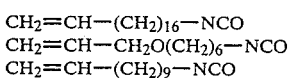

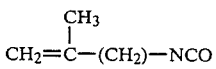

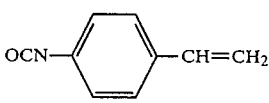

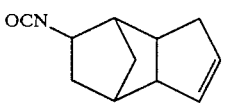

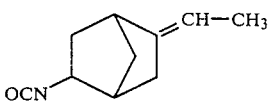

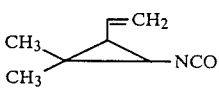

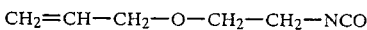

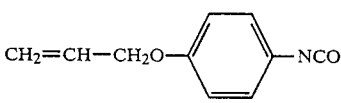

-continued

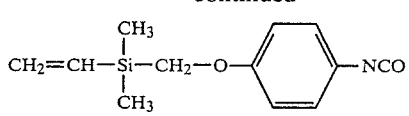

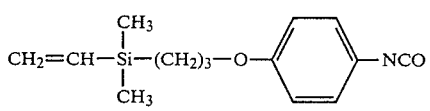

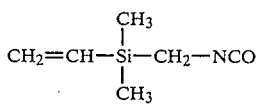

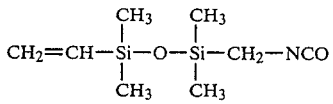

The difunctional compound (Ib) comprising the polysiloxane block can be prepared by hydrosilylation of the α,ω-dihydrogenopolysiloxane of the formula (IV) with a monoalcohol comprising one site of ethylenic unsaturation and having one of the following structural formulae:

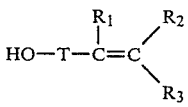

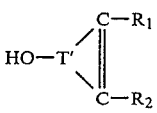

The unsaturated alcohol can therefore have an alicyclic, cyclic or bicyclic aliphatic structure. It can be a primary alcohol, secondary alcohol, or the like, but it will preferably be a primary alcohol. It is easy to determine the precise nature of the various unsaturated alcohols which can be used, in view of the fact that the various symbols T, T', $R_1$, $R_2$ and $R_3$ have already been defined above.

Among the unsaturated alcohols, the compounds having the following structural formulae are representative:

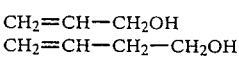

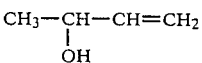

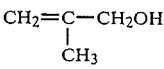

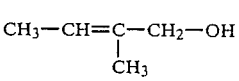

-continued

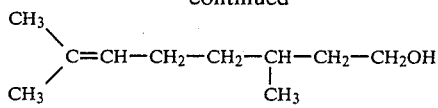

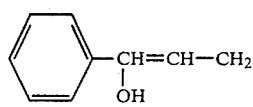

The hydrosilylation of the unsaturated functional compound with the α,ω-dihydrogenopolysiloxane is carried out in accordance with any known technique (compare, for example, W. Noll: *Chemistry and Technology of Silicones* (1968), page 49 et seq.).

Thus, the hydrosilylation reaction can be carried out by heating the reactants to form 150° to 350° C. under autogenous pressure, in the absence of catalysts. The reaction can also be carried out in the presence of the customary catalysts, which makes it possible to use lower temperatures, on the order of 0° to 200° C., and to carry out the reaction more rapidly at normal pressure.

Catalysts which can be used are free-radical generators, such as peroxide compounds (acyl peroxides, alkyl peroxides and peresters). The following are illustrative types of such compounds: benzoyl peroxide, acetyl peroxide, lauroyl peroxide, t-butyl perbenzoate, t-butyl peracetate and t-butyl peroxide. The same effect is obtained if the reaction is carried out under ultraviolet irradiation instead of in the presence of catalysts which generate free radicals.

Another group of catalysts which can be used to prepare the difunctional compounds of the formula (I) consists of the metals of Group VIII of the Periodic Classification of Elements (compare *Handbook of Chemistry and Physics,* 53rd edition) and their inorganic or organic derivatives. Among these metals, Pt, Ru, Rh, Pd and Ir are especially worthwhile. The noble metals, and very especially platinum, are particularly suitable. They can be used as the metallic elements, per se, or in the form of salts with mineral acids, in particular halides, salts with organic acids or complexes. Such catalysts have been described in the literature; compare, for example, U.S. Pat. Nos. 2,637,738 and 2,632,013; J. L. Speier et al, *J. Amer. Chem. Soc.,* 79, page 974 et seq. (1957); and A. J. Chalk et al., *J. Amer. Chem. Soc.,* 87, 16 (1965).

Among these catalysts based upon the metals of Group VIII, those based on platinum are very particularly suitable and are preferably used. Same can have various forms which are well known from the technical literature. Thus, it is possible to use the various catalysts based on finely divided elementary platinum which either may or may not be deposited upon a variety of supports, such as carbon black, alumina or silica; catalysts of this type have been described, in particular, in U.S. Pat. No. 2,970,150. Another family of platinum catalysts consists of chloroplatinic acid (compare U.S. Pat. No. 2,823,218) and the compounds derives therefrom, such as alkali metal chloroplatinates (compare J. L. Speier, loc. cit.) and compounds obtained by reacting chloroplatinic acid with alcohols, ethers or aldehydes (compare U.S. Pat. No. 3,220,972), olefins (compare U.S. Pat. No. 3,159,601) or cyclopropane (compare U.S. Pat. No. 3,159,662). It is also possible to use complexes of platinum halides with compounds which donate electron pairs, such as phosphines, for example bis-(tributylphosphino)-dichloroplatinum(II) and bis-(triphenylphosphino)-dichloroplatinum(II) (compare A. J. Chalk et al, loc. cit.). The catalyst which are preferably used in the present invention are elementary platinum deposited upon carbon, and chloroplatinic acid and its derivatives.

The hydrosilylation reaction can be carried out in the absence of a solvent or by bringing the reactants, and if appropriate the catalyst, into intimate contact in an organic medium consisting of a solvent or a diluent which is inert under the reaction conditions. In this respect, it is advantageous, in particular, to use saturated aliphatic hydrocarbons (pentane, hexane and heptane), saturated cycloaliphatic hydrocarbons (cyclohexane), aromatic hydrocarbons (benzene and toluene), halogenated hydrocarbons (chloroform, dichloroethane and chlorobenzene) or esters (methyl acetate, ethyl acetate and butyl acetate). The choice of the reaction medium depends upon the nature of the starting material reactants and upon the temperature at which the reaction proceeds. The latter can be carried out in solution or in suspension, depending on whether one or both of the reactants are soluble or insoluble in the medium selected.

The relative amounts of the unsaturated monofunctional compound and the α,ω-dihydrogenopolysiloxane can vary over wide limits. Thus, the relative amount of the reactants, expressed as the ratio of the number of alkenyl groups to the number of active hydrogen atoms provided by the hydrogenosilyl groups, can vary from 2 to 0.5. However, the ratio defined above is preferably on the order of 1, it then being possible to use a slight excess of one or the other of the reactants. Thus, the ratio alkenyl groups/H can vary between 1.2 and 0.8.

If a catalyst is employed to carry out the hydrosilylation reaction, the amount thereof can vary over very wide limits, depending upon the nature of the catalysts, the nature of the reactants and the reaction conditions. In the case where a free-radical generator is used, it is possible, for example, to use from $10^{-4}$ to 0.1 mol of catalyst per mol of compound, although these limites can be exceeded to no disadvantage. If the catalyst is one of the metals mentioned above or a derivative of these metals, in particular platinum, the amount of catalyst, expressed in gram atoms of metal per alkenyl group present in the unsaturated compound, can vary between $10^{-6}$ and $10^{-1}$ gram atom of metal per alkenyl group, and preferably between $10^{-5}$ and $10^{-2}$.

As above-indicated, the reaction temperature can vary over wide limits, depending on whether or not the reaction is carried out in the presence of a catalyst, or, in the former case, depending on the nature and the amount of the catalyst used. Overall, the temperature can range from 0° to 300° C. and preferably from 20° to 250° C. The use of platinum catalysts makes it possible to carry out the reaction at temperature on the order of 10° to 200° C. The reaction can also be carried out at a pressure which is above, below or equal to atmospheric pressure.

When the hydrosilylation reaction is complete, the difunctional compounds (I) can be separated from the reaction medium and then purified by any known means.

The copolymers according to the invention are characterized both by their good elastomeric properties and by their ability to withstand high thermal stresses. In fact, their modulus of elasticity varies only slightly within a temperature range from ambient temperature to temperatures as high as 160°. This result is particularly notworthy in view of the fact that the block copolymers comprise a nonpolydimethylsiloxane "part", which can be as much as 50%.

On account of their good thermomechanical properties and their essential "silicone" quality, the block copolymers can be used as additives for imparting the properties of silicones and for improving the thermomechanical properties of numerous compounds.

In order to further illustrate the present invention and the advantages thereof, the following specific examples are given, it being understood that same are intended only as illustrative and in nowise limitative.

EXAMPLE 1

Preparation of the block copolymer, the polymeric chains comprising the following recurring units

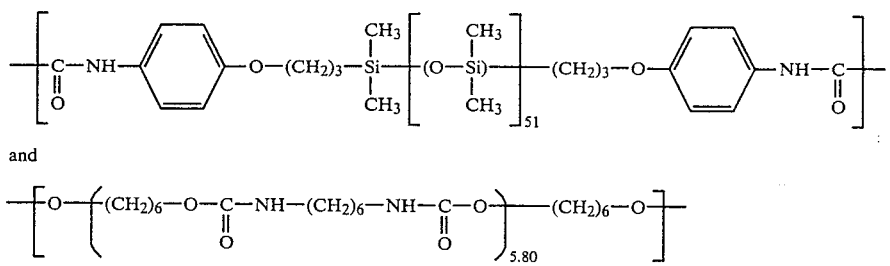

and

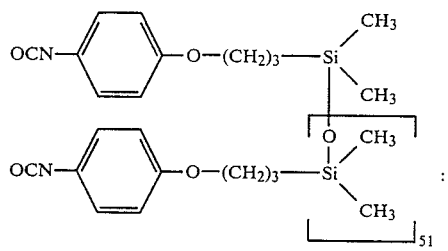

Preparation of the copolymer

The following reactants were introduced into a reactor containing 80.5 g of o-dichlorobenzene:

(1) Bis-α,ω-[3-(p-isocyanatophenoxy)-propyl]-polydimethylpolysiloxane:

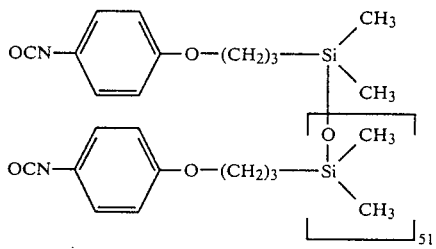

20.134 g (namely, 0.00377 mol);
(2) Hexane-1,6-diol: 3,030 g (namely, 0.02568 mol);
(3) 1,6-Diisocyanatohexane: 3.680 g (namely, 0.02190 mol).

It is thus calculated that the number r was equal to 0.147 and that the ratio NCO/OH was equal to 0.999.

The reactor was purged and maintained under a nitrogen atmosphere and then heated for 17 hours, 40 minutes at 135° C., under stirring. It was found that the mixture remained homogeneous throughout the operation.

The copolymer was isolated by precipitation in methanol. After washing with methanol (2 times, 400 ml) and drying in an oven at 100° for 3 hours under a pressure of 20 mm of mercury, elastic flakes were obtained which could be compression-molded.

8 to 9 g of dry copolymer were thus placed in a parallelepipedal mold (l=60 mm, w=60 mm, h=2 mm); the mold was then placed under a press for 10 to 15 minutes at 180° C. This provided transparent 2 mm thick plates possessing the following properties:

(a) Tensile strength at 20°: 78 kg/cm²
(b) Elongation at break at 20°: 357%
(c) Shore A hardness: 71

The copolymers substantially retained their mechanical properties up to 160° C.

Preparation of the
bis-α,ω-[3-(p-isocyanatophenoxy)-propyl]-polydimethylpolysiloxane

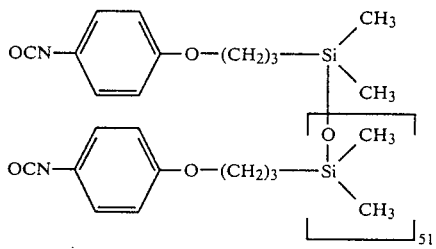

40 g of toluene and 90 g of α,ω-dihydrogenopolydimethylsiloxane:

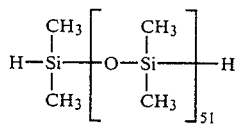

were introduced into a reactor; the mixture was heated to the reflux temperature and 16 g of allyloxy-1,4-diisocyanatobenzene and 2 ml of a catalyst consisting of a solution of chloroplatinic acid, containing 0.06% of Pt, in ethylhexanol were then added thereto. The total reaction time was 5 hours, 20 minutes. The degree of conversion of the Si-H groups was 100%.

After devolatilization for 45 minutes at 120°-124° under a pressure of 2 mm of mercury, a compound accoding to the above formula was obtained, which contained 0.0375% of NCO groups and of which the number-average molecular weight was 5,340.

EXAMPLE 2

Preparation of the block copolymer, the polymeric chains comprising the following recurring units

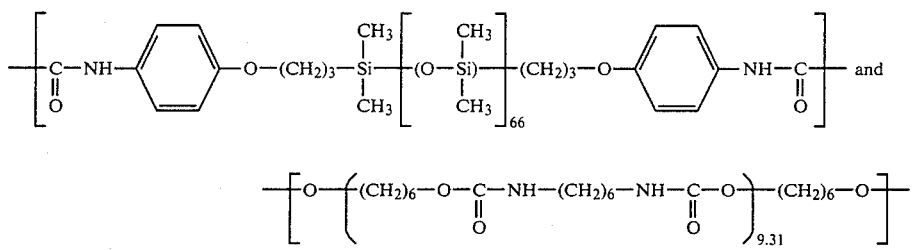

The copolymer was prepared by following the procedure described in Example 1, the following amounts being introduced:
(1) o-Dichlorobenzene: 88 g;
(2) Bis-$\alpha,\omega$-[3-(pisocyanatophenoxy)-propyl]-polydimethylpolysiloxane: 20.610 g (namely, 0.00317 mol);
(3) Hexane-1,6-diol: 3,864 g (namely, 0.03274 mol);
(4) 1,6-Diisocyanatohexane: 4.969 g (namely, 0.02958 mol).

The ratio r was equal to 0.097 and the ratio NCO/OH was equal to 1.000.

The condensation was carried out for 7 hours, 10 minutes at 157° C. Upon completion of the reaction, the mixture was slightly turbid.

The copolymer was isolated after precipitation by adding methanol. The mechanical properties of the plates obtained after molding were as follows:
(a) Tensile strength at 20°: 74 kg/cm$^2$
(b) Elongation at break at 20°: 256%
(c) Shore A hardness: 66

EXAMPLE 3

Preparation of the block copolymer, the polymeric chains comprising the following recurring units

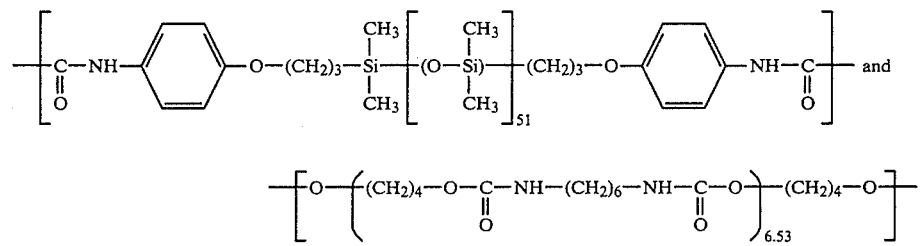

The copolymer was prepared by following the procedure described in Example 1, the following amounts being introduced:
(1) o-Dichlorobenzene: 60.1 g
(2) Bis-$\alpha,\omega$-[3-(p-isocyanatophenoxy)-propyl]-polydimethylpolysiloxane: 14.006 g (namely 0.00329 mol);
(3) Hexane-1,6-diol: 2.706 g (namely, 0.02293 mol);
(4) 1,6-Diisocyanatohexane: 3.295 g (namely, 0.01961 mol).

The ratio r was equal to 0.143 and the ratio NCO/OH was equal to 0.998.

The condensation was carried out for 19 hours, 30 minutes at 130° C. Upon completion of the reaction, the mixture was clear.

The copolymer was isolated after precipitation by adding methanol. the mechanical properties thereof were as follows:
(a) Tensile strength at 20°: 79 kg/cm$^2$
(b) Elongation at break at 20°: 159%

EXAMPLE 4

Preparation of the block copolymer, the polymeric chains comprising the following recurring units

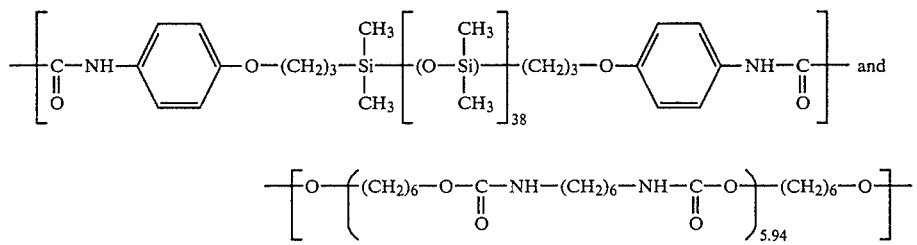

The copolymer was prepared by following the procedure described in Example 1, the following amounts being introduced:
(1) o-Dichlorobenzene: 79 g;
(2) Bis-$\alpha,\omega$-[3-(p-isocyanatophenoxy)-propyl]-polydimethylpolysiloxane: 19.669 g (namely, 0.00368 mol);
(3) Butane-1,4-diol: 2.503 g (namely, 0.02781 mol);
(4) 1,6-Diisocyanatohexane: 4.053 g (namely, 0.02412 mol).

The ratio r was equal to 0.132 and the ratio NCO/OH was equal to 0.999.

The condensation was carried out for 17 hours, 35 minutes at 137°–140° C. Upon completion of the reaction, the mixture was slightly turbid.

The copolymer was isolated after precipitation by adding methanol. The mechanical properties of the plates obtained after molding were as follows:
(a) Tensile strength at 20°: 70 kg/cm²
(b) Elongation at break at 20°: 204%
(c) Shore A hardness: 73

EXAMPLE 5

Preparation of the block copolymer, the polymeric chains comprising the following recurring units

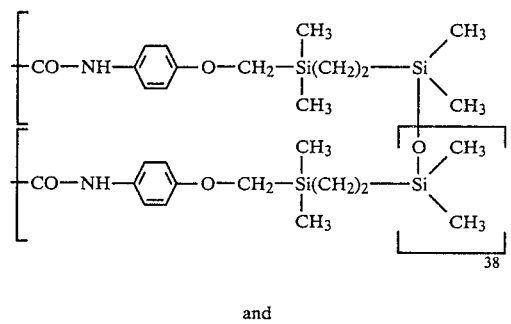

and

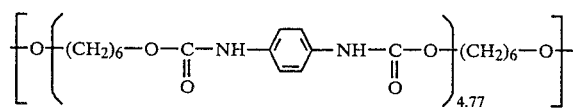

The following reactants were introduced into a reactor containing 68.6 g of o-dichlorobenzene:
(1) Bis-α,ω-[p-isocyanatophenylmethoxy-(β-dimethyl-silylethyl)]-polydimethylpolysiloxane:

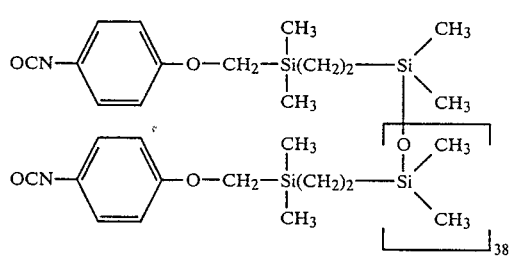

16.001 g (namely, 0.00453 mol);
(2) Hexane-1,6-diol: 3.094 g (namely, 0.02622 mol);
(3) Diisocyanatotoluene (80/20): 3.764 g (namely, 0.02163 mol).

It is thus calculated that the number r was equal to 0.173 and that the ratio NCO/OH was equal to 0.998.

The reactor was purged and maintained under a nitrogen atmosphere and then heated for 18 hours at 128°–130° C., under stirring. It was found that the mixture became slightly turbid after a reaction time of 20 minutes.

The copolymer was isolated after evaporation of the solvent.

After molding, transparent 2 mm thick plates were obtained which possessed the following properties:
(a) Tensile strength at 20°: 64 kg/cm²
(b) Elongation at break at 20°: 204%

EXAMPLE 6

Preparation of the block copolymer, the polymeric chains comprising the following recurring units

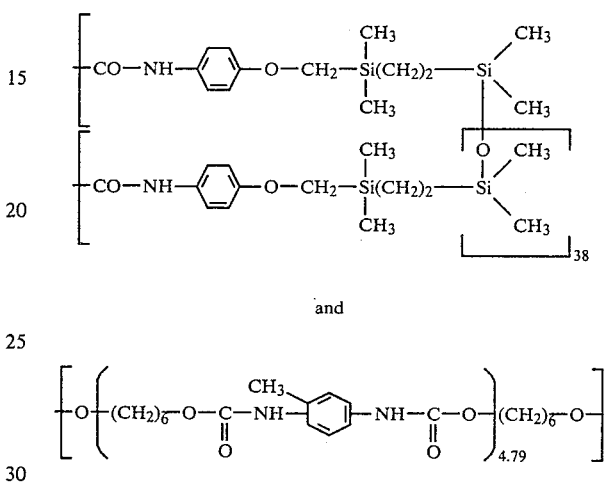

and

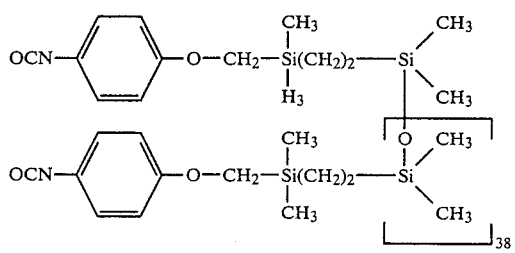

The following reactants were introduced into a reactor containing 43 g of tetrachloroethane:
(1) Bis-α,ω-[p-isocyanatophenylmethoxy-(β-dimethyl-silylethyl)]-polydimethylsiloxane:

10.01 g (namely, 0.00283 mol);
(2) Hexane-1,6-diol: 1.934 g (namely, 0.01639 mol);
(3) Diisocyanatotoluene (80/20): 2.355 g (namely, 0.01353 mol).

It is thus calculated that the number r was equal to 0.276 and that the ratio NCO/OH was equal to 1.102.

The reactor was purged and maintained under a nitrogen atmosphere and then heated for 18 hours at 130° C., under stirring. It was found that the mixture remained homogeneous throughout the operation.

The copolymer was isolated by evaporation of the solvent in an oven.

After compression molding, transparent 2 mm thick plates were obtained which possessed the following properties:
(a) Tensile strength at 20°: 45 kg/cm²
(b) Elongation at break at 20°: 159%

EXAMPLE 7

Preparation of the block copolymer, the polymeric chains comprising the following recurring units

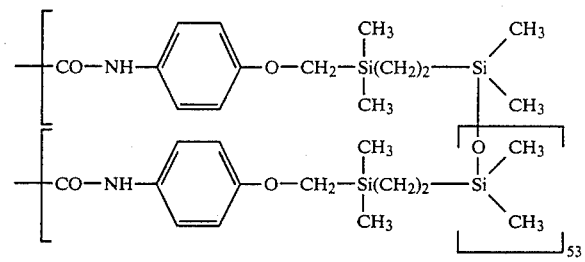

and

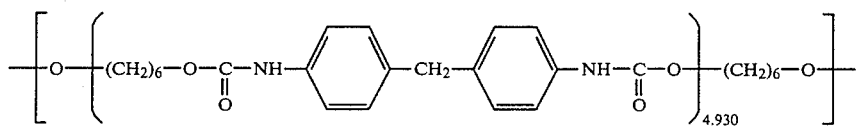

The following reactants were introduced into a reactor containing 75.05 g of o-dichlorobenzene:
(1) Bis-α,ω-[p-isocyanatophenylmethoxy-(β-dimethylsilylethyl)]-polydimethylpolysiloxane:

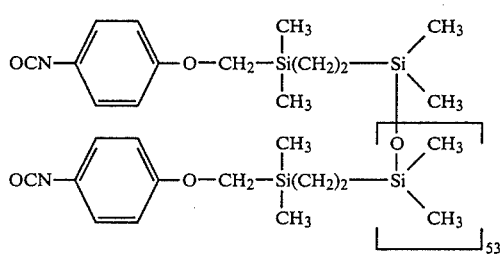

18.746 g (namely, 0.00407 mol);
(2) Hexane-1,6-diol: 2.863 g (namely, 0.02426 mol);
(3) 4,4'-Bis-isocyanatodiphenylmethane: 3.384 g (namely, 0.02014 mol).

It is thus calculated that the number r was equal to 0.168 and that the ratio NCO/OH was equal to 0.998.

The reactor was purged and maintained under a nitrogen atmosphere and then heated for 18 hours, 30 minutes at 125°–130° C., under stirring. It was found that the mixture remained homogeneous throughout the operation.

The copolymer was isolated by precipitation by adding acetone.

After compression molding, transparent 2 mm thick plates were obtained which possess the following properties:
(a) Tensile strength at 20°: 85 kg/cm$^2$
(b) Elongation at break at 20°: 332%
(c) Shore A hardness: 70.

EXAMPLE 8

Preparation of the block copolymer, the polymeric chains comprising the following recurring units

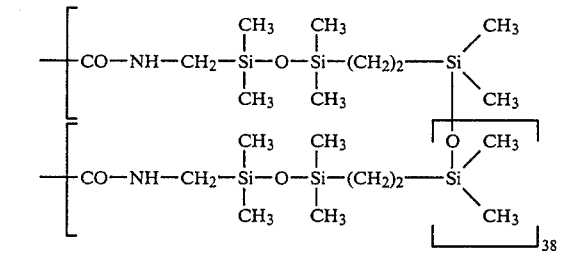

and

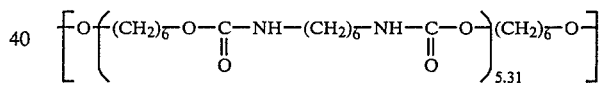

The following reactants were introduced into a reactor containing 77.4 g of o-dichlorobenzene:
(1) Polysiloxane macrodiisocyanate:

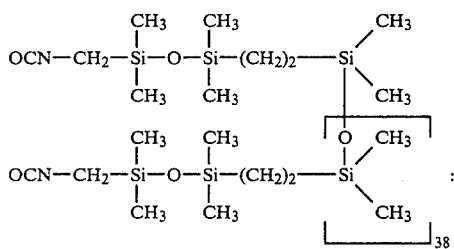

18.067 g (namely, 0.00472 mol);
(2) Hexane-1,6-diol: 3.520 g (namely, 0.02983 mol);
(3) 1,6-Diisocyanatohexane: 4.215 g (namely, 0.02509 mol).

It is thus calculated that the number r was equal to 0.158 and that the ratio NCO/OH was equal to 0.999.

The reactor was purged and maintained under a nitrogen atmosphere and then heated for 18 hours, 30 minutes at 130° C., under stirring. It was found that the mixture became turbid after a condensation time of 10 minutes.

The copolymer was isolated by precipitation by adding acetone.

After compression molding, transparent 2 mm thick plates were obtained which possess the following properties:

(a) Tensile strength at 20°: 52 kg/cm²
(b) Elongation at break at 20°: 150%

EXAMPLE 9

Preparation of the block copolymer, the polymeric chains comprising the following recurring units

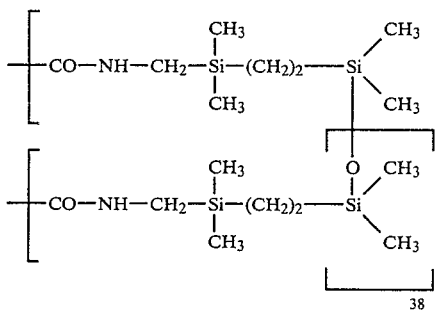

and

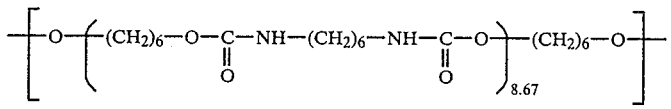

The following reactants were introduced into a reactor containing 81.6 g of o-dichlorobenzene:
(1) Polysiloxane macrodiisocyanate:

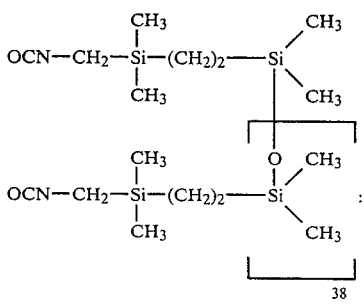

16.328 g (namely, 0.00419 mol);
(2) Hexane-1,6-diol: 4.787 g (namely, 0.04057 mol);
(3) 1,6-Diisocyanatohexane: 6.107 g (namely, 0.03635 mol).

It is thus calculated that the number r was equal to 0.103 and that the ratio NCO/OH was equal to 0.999.

The reactor was purged and maintained under a nitrogen atmosphere and then heated for 18 hours at 130° C., under stirring. It was found that the mixture became turbid after a reaction time of 1 hour, 20 minutes.

The copolymer was isolated by precipitation by adding acetone; this yielded elastic flakes which could be compression-molded.

8 to 9 g of dry copolymer were thus placed in a parallelepipedal mold (l=60 mm, w=60 mm, h=2 mm); the mold was then placed under a press for 10 to 15 minutes at 180° C. After compression molding, transparent 2 mm thick plates were obtained which possessed the following properties:

(a) Tensile strength at 20°: 30 kg/cm²
(b) Elongation at break at 20°: 62%

EXAMPLE 10

Preparation of the block copolymer, the polymeric chains comprising the following recurring units

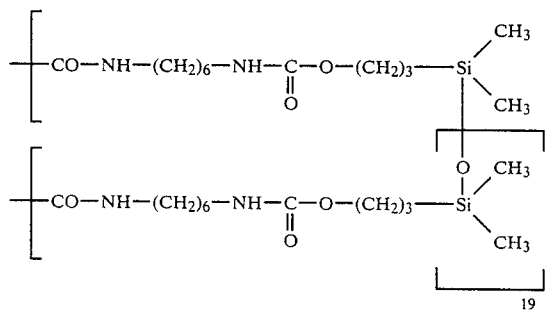

and

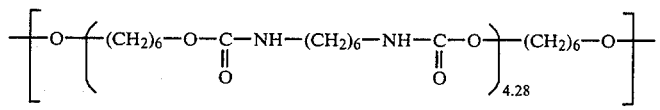

[A] Preparation of the copolymer

The following reactants were introduced into a reactor containing 94 g of o-dichlorobenzene:
(1) Polysiloxane macrodiol: α,ω-bis-(γ-hydroxypropyl)-polydimethylpolysiloxane:

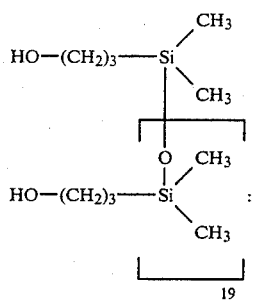

15.364 g (namely, 0.00942 mol);

(2) Hexane-1,6-diol: 5.880 g (namely, 0.04983 mol);
(3) 1,6-Diisocyanatohexane: 9.955 g (namely 0.05925 mol).

It is thus calculated that the number r was equal to 0.159 and the ratio NCO/OH was equal to 1.000.

The reactor was purged and maintained under a nitrogen atmosphere and then heated for 16 hours, 50 minutes at 130°–135° C., under stirring. It was found that the mixture became slightly turbid upon completion of the operation.

The copolymer was isolated by precipitation by adding methanol.

After compression molding, transparent 2 mm thick plates were obtained which possessed the following properties:
(a) Tensile strength at 20°: 172 kg/cm²
(b) Elongation at break at 20° C.: 142%
(c) Shore A hardness: 94

[B] Preparation of the α,ω-bis-(γ-hydroxypropyl)-polydimethylpolysiloxane

The following reactants were introduced into a round-bottomed flask:
(1) α,ω-Dihydrogenopolydimethylpolysiloxane oil: 41.8 g
(2) Allyl alcohol: 5.25 g
(3) Toluene: 15.4 g;

the reaction mass was heated to 100° C. and the catalyst, consisting of a solution of chloroplatinic acid, containing 0.06% of Pt, in ethylhexanol (1.4 ml), was then introduced. The reaction was total after one hour at 120°–125° C. After devolatilization under reduced pressure (1 hour at 100° C. under a vacuum of 0.01 mm Hg), an oil was obtained in which the proportion of OH groups corresponded to the expected formula.

EXAMPLE 11

Preparation of the block copolymer, the polymeric chains comprising the following recurring units

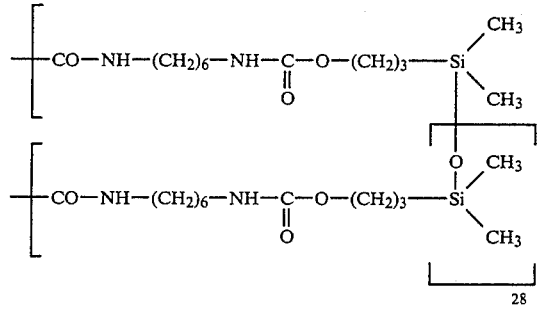

and

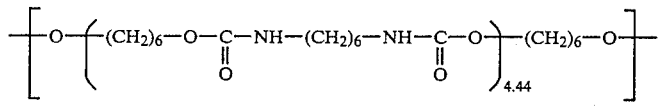

The following reactants were introduced into a reactor containing 128 g of o-dichlorobenzene:
(1) Polysiloxane macrodiol: α,ω-bis-(γ-hydroxypropyl)-polydimethylpolysiloxane:

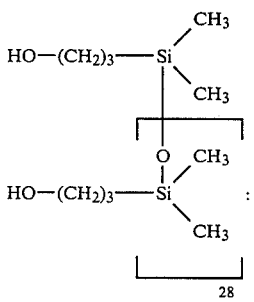

25.637 g (namely, 0.00990 mol);

(2) Hexane-1,6-diol: 6.366 g (namely, 0.05395 mol);
(3) 1,6-Diisocyanatohexane: 10.726 g (namely, 0.06384 mol).

It is thus calculated that the number r was equal to 0.155 and that the ratio NCO/OH was equal to 1.000.

The reactor was purged and maintained under a nitrogen atmosphere and then heated for 17 hours, 15 minutes at 130°–138° C., under stirring. It was found that the mixture became slightly turbid upon completion of the operation.

The copolymer was isolated by precipitation by adding methanol.

After compression molding, transparent 2 mm thick plates were obtained which possessed the following properties:
 (a) Tensile strength at 20°: 100 kg/cm²
 (b) Elongation at break at 20°: 123%
 (c) Shore A hardness: 91

EXAMPLE 12

Preparation of the block copolymer, the polymeric chains comprising the following recurring units

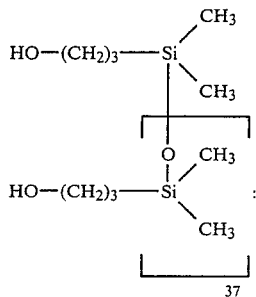

16.416 g (namely, 0.00494 mol); and
(2) 1,6-Diisocyanatohexane: 5.532 g (namely, 0.03293 mol).

The reaction was permitted to proceed for 4 hours, 40 minutes at 130° C.; 55 g of ortho-dichlorobenzene and hexane-1,6-diol, namely, 3.302 g (0.02798 mol), were then added thereto and the mixture was then heated again for 13 hours, 25 minutes at 130°–135° C.

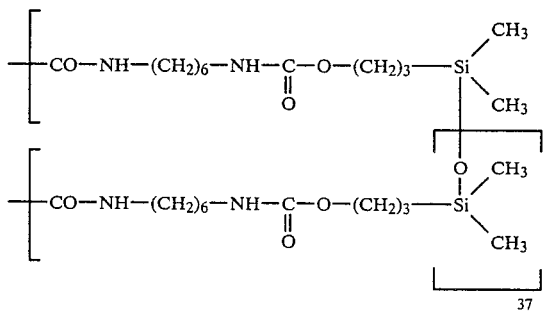

and

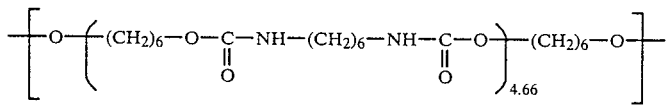

The following reactants were introduced into a reactor containing 20 g of o-dichlorobenzene:
(1) Polysiloxane macrodiol: α,ω-bis-(γ-hydroxypropyl)-polydimethylpolysiloxane:

It is thus calculated that the number r was equal to 0.150 and that the ratio NCO/OH was equal to 0.999.

It was found that the mixture remained homogeneous throughout the operation.

The copolymer was isolated by precipitation by adding methanol.

After compression molding, transparent 2 mm thick plates were obtained which possessed the following properties:
 (a) Tensile strength at 20°: 76 kg/cm²
 (b) Elongation at break at 20°: 136%
 (c) Shore A hardness: 86

EXAMPLE 13

Preparation of the block copolymer, the polymeric chains comprising the following recurring units

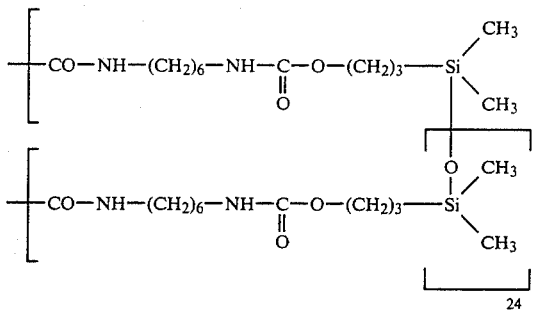

and

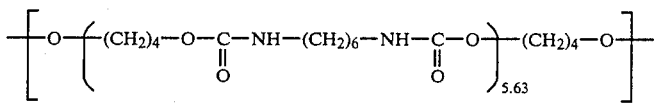

The following reactants were introduced into a reactor containing 94 g of o-dichlorobenzene:

(1) Polysiloxane macrodiol: α,ω-bis-(γ-hydroxypropyl)-polydimethylpolysiloxane:

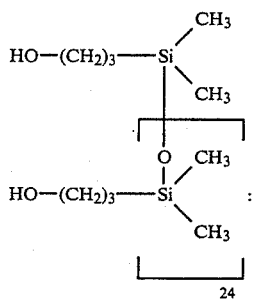

17.241 g (namely, 0.00753 mol);
(2) Butane-1,4-diol: 4.479 g (namely, 0.04977 mol);
(2) 1,6-Diisocyanatohexane: 0.625 g (namely, 0.05729 mol).

It is thus calculated that the number r was equal to 0.131 and that the ratio NCO/OH was equal to 1.000.

The reactor was purged and maintained under a nitrogen atmosphere and then heated for 17 hours at 135°-137° C., under stirring. It was found that the mixture became slightly turbid upon completion of the operation.

The copolymer was isolated by precipitation by adding methanol.

After compression molding, transparent 2 mm thick plates were obtained which possessed the following properties:

(a) Tensile strength at 20°: 127 kg/cm²
(b) Elongation at break at 20°: 121%
(c) Shore A hardness: 93

EXAMPLE 14

Preparation of the block copolymers, the polymeric chains comprising the following recurring units

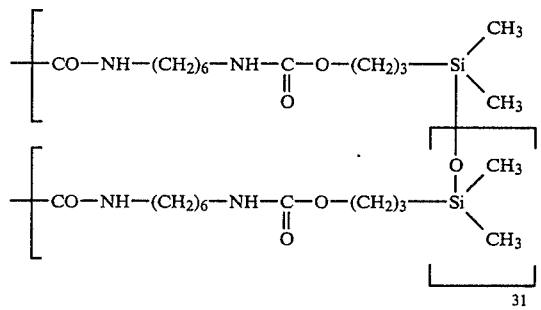

and

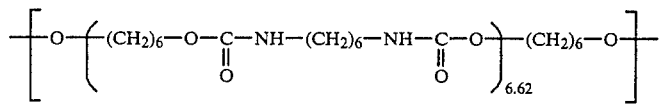

The following reactants were introduced into a reactor containing 33 g of o-dichlorobenzene:

(1) Polysiloxane macrodiol: α,ω-bis-(γ-hydroxypropyl)-polydimethylpolysiloxane:

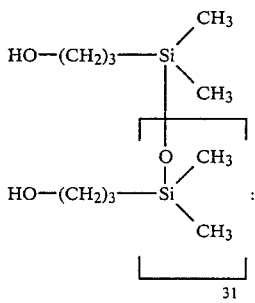

18.850 g (namely, 0.00659 mol); and (2) 1,6-Diisocyanatohexane: 9.522 g (namely, 0.05668 mol).

The reaction was permitted to proceed for 1 hour at 126°–130° C.; 70 g of ortho-dichlorobenzene and hexane-1,6-diol, namely, 5.911 g (0.05009 mol), were then added thereto and the mixture was then heated again for 2 hours at 130°–132° C. after a catalyst for the formation of urethane had been added in an amount of 0.2% (dimethyl-tin dilaurate).

It is thus calculated that the number r was equal to 0.116 and that the ratio NCO/OH was equal to 1.000.

It was found that the mixture remained homogeneous throughout the operation.

The copolymer was isolated by precipitation by adding methanol.

After compression molding, transparent 2 mm thick plates were obtained which possessed the following properties:

(a) Tensile strength at 20°: 107 kg/cm²
(b) Elongation at break at 20°: 162%
(c) Shore A hardness: 91

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. An organopolysiloxane/polyurethane thermoplastic elastomeric block copolymer having improved thermomechanical properties and a modulus of elasticity which is substantially constant within the temperature range from ambient temperatures to 160° C. consisting essentially of the following recurring units (A) and (B):

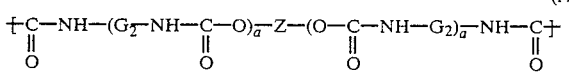 (A)

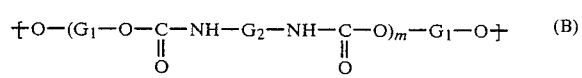 (B)

wherein Z is a divalent radical which comprises a polysiloxane block and has the formula:

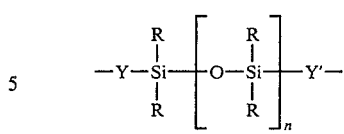

in which Y and Y' are each a divalent radical having one of the formulae:

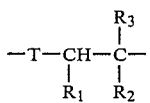

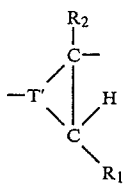

wherein T and T' comprise the divalent or trivalent residue having from 1 to 20 carbon atoms of an unsaturated isocyanate or alcohol having one of the formulae:

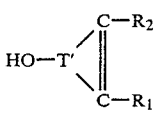

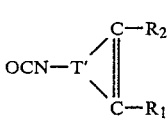

or an oxygen, sulfur, silicon, nitrogen, ester or amide interrupted such T or T' residue, and further wherein $R_1$, $R_2$ and $R_3$ are each hydrogen, alkyl or aryl, with the proviso that two of the radicals $R_1$ and $R_2$ may together form a single alkylene radical; each R is an alkyl or halogenoalkyl radical having from 1 to 5 carbon atoms and containing from 1 to 7 chlorine and/or fluorine substituents, cycloalkyl or halogenocycloalkyl radical having from 3 to 8 carbon atoms and containing from 1 to 4 chlorine and/or fluorine substituents, aryl, alkylaryl or halogenoaryl radical having from 6 to 8 carbon atoms and containing from 1 to 4 chlorine and/or fluorine substituents, or a cyanoalkyl radical having from 3 to 4 carbon atoms; n is a number of at least 10; $G_1$ and $G_2$ are each divalent hydrocarbon radicals having from 2 to 20 carbon atoms, or two such hydrocarbon radicals joined together by a direct valence bond or through an oxygen atom or alkylene or alkylidene bridge having from 1 to 4 carbon atoms; m is a number ranging from 1 to 20; and a is a number which is either zero or 1.

2. The elastomeric block copolymer as defined by claim 1, wherein T is alkylene, cycloalkylene, arylene, alkylarylene, arylalkylene, or two such alkylene, cycloalkylene or arylene radicals joined together by a direct valence bond or through an oxygen, sulfur, ester, amide, —N(R₄)— wherein R₄ is hydrogen or alkyl, or diorganosilyl bridge, said diorganosilyl bridge having the formula:

wherein R' is methyl, vinyl or phenyl, or a halogenated such radical; T' is alkanetriyl, cycloalkanetriyl or alkylcycloalkanetriyl; R₁, R₂ and R₃ are each hydrogen, alkyl having from 1 to 4 carbon atoms, phenyl or tolyl, with the proviso that two of the radicals R₁ and R₂ may together form a single linear or branched-chain alkylene radical having from 2 to 6 carbon atoms; G₁ is an alkylene radical having from 2 to 12 carbon atoms, cyclohexylene, cyclopentylene, or two such radicals joined together by a direct valence bond or through an oxygen atom or alkylene or alkylidene bridge having from 1 to 4 carbon atoms; G₂ is an alkylene radical having from 2 to 12 carbon atoms, cyclohexylene, cyclopentylene, phenylene, methylphenylene, dimethylphenylene, or two such radicals joined together by a direct valence bond or through an oxygen atom or alkylene or alkylidene bridge having from 1 to 4 carbon atoms; n is a number ranging from 10 to 80; and m is a number ranging from 4 to 10.

3. The elastomeric block copolymer as defined by claim 2, wherein T is alkylene of up to 12 carbon atoms, cyclopentylene, cyclohexylene, phenylene, methylphenylene, dimethylphenylene, or two such radicals joined together by a direct valence bond or through one of the following hetero-atoms or bridges:

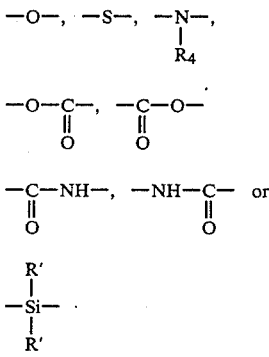

wherein R₄ is hydrogen or alkyl having from 1 to 4 carbon atoms, and R' is methyl, vinyl or phenyl; T' is:

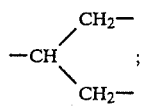

R₁, R₂ and R₃ are each hydrogen, methyl, ethyl or phenyl, with the proviso that two of the radicals R₁ and R₂ may together form a trimethylene or tetramethylene radical; R is methyl, vinyl or phenyl, or halogenated such radical containing from 1 to 4 chlorine and/or fluorine substituents; G₁ is an alkylene radical having from 2 to 6 carbon atoms, cyclopentylene or cyclohexylene, or two such radicals joined together by a direct valence bond or through an oxygen atom or methylene bridge; and G₂ is an alkylene radical having from 2 to 6 carbon atoms, cyclopentylene, cyclohexylene, phenylene or methylphenylene, or two such radicals joined together by a direct valence bond or through an oxygen atom or methylene bridge.

4. The elastomeric block copolymer as defined by claim 3, wherein Y is a divalent radical having the formula:

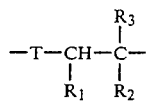

in which T is alkylene of up to 12 carbon atoms, cyclopentylene, cyclohexylene, phenylene, methylphenylene, or two such alkylene, cyclohexylene or cyclopentylene radicals joined together by a direct valence bond or through one of the following hetero-atoms or bridges:

—O—, —O—C—, —C—O—,
         ‖       ‖
         O       O

—C—NH—, —NH—C— or
 ‖             ‖
 O             O

wherein R' is methyl; R₁, R₂ and R₃ are each hydrogen, methyl, ethyl or phenyl, with the proviso that two of the radicals R₁ and R₂ may together form a trimethylene or tetramethylene radical; R is methyl; G₁ is a linear alkylene radical having from 4 to 6 carbon atoms; and G₂ is an alkylene radical having from 2 to 6 carbon atoms, cyclopentylene, cyclohexylene, phenylene, or the combination of two such alkylenes, cyclohexylene or cyclopentylene radicals.

5. A process for the preparation of the organopolysiloxane/polyurethane elastomeric block copolymer as defined by claims 2, 3, 4 or 1, comprising reacting a difunctional compound having the formula (I):

X—Z—X'  (I)

with at least one diol having the formula (II):

HO—G₁—OH  (II)

and with at least one diisocyanate having the formula (III):

OCN—G₂—NCO  (III)

in a halogenated hydrocarbon solvent reaction medium, wherein the compound having the formula (I), X and X' are identical and each is a hydroxyl or isocyanate group, the reactants having the formulae (I), (II) and (III) being present in such amounts that the ratio of the total amount of the NCO functions to the total amount of OH functions ranges from 0.9 to 1.1 and the molar ratio r, the ratio of the reactant (I) to the reactants (II) or (III), ranges from 0.045 to 0.5, and with said reactants (II) and (III) being such as to react with the reactant (I) to form two urethane linkages therebetween.

6. The process as defined by claim 5, wherein the ratio NCO/OH ranges from 0.95 to 1.05 and the ratio r ranges from 0.08 to 0.170.

7. The process as defined by claim 5, wherein X and X' are each an isocyanate group.

8. The process as defined by claim 5, wherein X and X' are each a hydroxyl group.

9. The process as defined by claim 5, wherein the halogenated hydrocarbon solvent reaction medium is o-dichlorobenzene or tetrachloroethane.

10. A shaped article comprising the elastomeric block copolymer as defined by claim 1.

11. The process as defined by claim 8, wherein in a first step the difunctional compound of formula (I):

$$X-Z-X' \qquad (I)$$

wherein X and X' are each hydroxyl groups, is reacted with at least a portion of said at least one diisocyanate having the formula (III):

$$OCN-G_2-NCO \qquad (III)$$

to produce a macrodiisocyanate intermediate product containing said polysiloxane block Z, and in a second step said macrodiisocyanate intermediate product is reacted with said at least one diol having the formula (II):

$$HO-G_1-OH \qquad (II)$$

and any remaining amount of said at least one diisocyanate of formula (III) to produce said organopolysiloxane/polyurethane elastomeric block copolymer.

* * * * *